United States Patent
Kadaba et al.

(10) Patent No.: US 9,961,001 B2
(45) Date of Patent: May 1, 2018

(54) SYSTEM AND METHOD FOR CATEGORIZING PACKET FLOWS IN A NETWORK

(71) Applicant: TELEFONAKTIEBOLAGET L M ERICSSON (PUBL), Stockholm (SE)

(72) Inventors: Srinivas Kadaba, Fremont, CA (US); Chris Phillips, Hartwell, GA (US)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 142 days.

(21) Appl. No.: 14/660,811

(22) Filed: Mar. 17, 2015

(65) Prior Publication Data

US 2016/0277299 A1 Sep. 22, 2016

(51) Int. Cl.
| | |
|---|---|
| *H04L 12/851* | (2013.01) |
| *H04L 12/801* | (2013.01) |
| *H04L 12/24* | (2006.01) |
| *H04L 12/26* | (2006.01) |
| *H04L 12/54* | (2013.01) |

(52) U.S. Cl.
CPC ............ *H04L 47/12* (2013.01); *H04L 12/56* (2013.01); *H04L 41/142* (2013.01); *H04L 41/509* (2013.01); *H04L 43/026* (2013.01); *H04L 47/24* (2013.01); *H04L 47/2483* (2013.01)

(58) Field of Classification Search
CPC ........ H04L 47/10; H04L 47/12; H04L 47/20; H04L 47/24; H04L 47/2483; H04L 47/32; H04L 47/38; H04L 47/70; H04L 47/72; H04L 47/74; H04L 47/78; H04L 47/80; H04L 41/509; H04L 12/56
See application file for complete search history.

(56) References Cited

U.S. PATENT DOCUMENTS

| | | | |
|---|---|---|---|
| 6,975,592 B1 * | 12/2005 | Seddigh | H04L 47/10 370/230 |
| 7,664,048 B1 | 2/2010 | Yung et al. | |
| 7,684,320 B1 | 3/2010 | Nucci | |
| 2007/0076606 A1 * | 4/2007 | Olesinski | H04L 41/0893 370/230 |

(Continued)

FOREIGN PATENT DOCUMENTS

| | | |
|---|---|---|
| EP | 2 521 312 A2 | 11/2012 |
| EP | 2 618 524 A1 | 7/2013 |

OTHER PUBLICATIONS

Bar-Yanai R. et al.: "Realtime Classification for Encrypted Traffic", May 20, 2010 (May 20, 2010), Experimental Algorithms, Springer Berlin Heidelberg, Berlin, Heidelberg, pp. 373-385, XP019142577, ISBN: 978-642-13192-9, pp. 373-385, p. 373, line 1-p. 381, line 27.

(Continued)

*Primary Examiner* — Rina C Pancholi
(74) *Attorney, Agent, or Firm* — Sage Patent Group

(57) ABSTRACT

A scheme for of categorizing packet flows through a network node, e.g., a proxy or router. In one embodiment, packets of a particular flow arriving at the node are monitored for determining whether there is a specific packet traffic pattern associated with the particular flow. Responsive to the determining, appropriate techniques may be utilized for recognizing the specific packet traffic pattern as belonging to a category of packet flow, e.g., ABR video flow.

18 Claims, 5 Drawing Sheets

(56) References Cited

U.S. PATENT DOCUMENTS

| | | | |
|---|---|---|---|
| 2008/0046549 A1* | 2/2008 | Saxena | H04L 43/026 709/223 |
| 2011/0066415 A1* | 3/2011 | Thompson | H04Q 3/0083 703/13 |
| 2013/0107715 A1* | 5/2013 | Szabo | H04L 45/46 370/235 |
| 2013/0223442 A1* | 8/2013 | Narayanan | H04L 45/64 370/389 |
| 2013/0346596 A1* | 12/2013 | Balakrishnan | H04L 63/1425 709/224 |
| 2016/0080238 A1 | 3/2016 | Bar-Yanai et al. | |

OTHER PUBLICATIONS

Hyunwoo Nam et al. "Mobile video is inefficient: A traffic analysis," Technical report, Columbia University, 2013, the whole document.

Mansy A., "Network and end-host support for HTTP adaptive video streaming," Ph.D thesis, Georgia Institute of Technology, May 2014, the whole document.

Cloonan T. et al., "Competitive analysis of video streaming implementations," white paper, Arris Networks, the whole document.

* cited by examiner

SYSTEM AND METHOD FOR CATEGORIZING PACKET FLOWS IN A NETWORK

FIELD OF THE DISCLOSURE

The present disclosure generally relates to communication networks. More particularly, and not by way of any limitation, the present disclosure is directed to a system and method for categorizing packet flows in a communications network configured to transport adaptive bitrate (ABR) flows.

BACKGROUND

Adaptive bit rate (ABR) content is transported over Internet Protocol (IP) networks using Hypertext Transfer Protocol (HTTP). ABR content may also be encrypted using Digital Rights Management (DRM) techniques to prevent content theft. This renders the content indistinguishable from regular web pages, which are also transported using HTTP. As a result, IP routers along the path to the consumer may not be able to implement techniques for facilitating high quality delivery based on service differentiation, potentially causing an unsatisfactory service experience for consumers, in addition to imposing new requirements on video providers and network operators.

In general, current trends towards "anytime, anywhere, and on any device" video consumption are driving the majority of video traffic away from the traditional "linear TV" model and, by and large, delivery of such on-demand traffic is being effectuated using ABR formats. Although techniques such as Deep Packet Inspection (DPI) have been available, they do not work for the ABR content flows that are typically delivered under DRM protection.

SUMMARY

The present patent disclosure is broadly directed to a system, apparatus, method, and associated non-transitory computer-readable media for facilitating a categorization scheme for IP packet flows in a network whereby quality-sensitive ABR traffic flows may be advantageously distinguished from other flows in the network. In one aspect, an embodiment of a method of categorizing packet flows through a network node involves, inter alia, monitoring packets of a particular flow arriving at the node and determining whether there is a specific packet traffic pattern associated with the particular flow based on a degree of correspondence between the monitored packets of the particular flow and a reference flow. Responsive to the determining, the method is operative to recognize the specific packet traffic pattern as belonging to a category of packet flow, e.g., ABR flow. In one example implementation, the category information may be associated or otherwise identified with the particular flow so that additional policy-based operations may be performed with respect to the ABR flow in the network.

In another aspect, an embodiment of an apparatus for categorizing packet flows through a network node is disclosed. The claimed embodiment comprises one or more processors and a persistent memory coupled to the one or more processors, wherein the persistent memory includes program instructions executable by one or more processors and configured to perform the following: monitor packets of a particular flow arriving at the node; determine that there is a specific packet traffic pattern associated with the particular flow based on a degree of correspondence between the monitored packets of the particular flow and a reference flow; responsive to the determining, recognize the specific packet traffic pattern as belonging to a category of packet flow; and associate the category with the particular flow.

In a further aspect, an embodiment of a system for categorizing packet flows through a data path element of a Software-Defined Network (SDN) is disclosed. The claimed embodiment comprises, inter alia, a packet tracker operating at the data path element to monitor packets of a particular flow arriving at the data path element and to populate a data structure of a specified length wherein arrival of packets of the particular flow is indicated by a first binary logic value and absence of packets of the particular flow is indicated by a second binary logic value. A pattern recognition module operative at a central controller may be configured to determine that there is a specific packet traffic pattern associated with the particular flow and, responsive to the determining, recognize the specific packet traffic pattern as belonging to a category of packet flow.

In a still further aspect, an embodiment of a network node is disclosed, wherein one or more processors are provided for overall control. One or more ingress ports and one or more egress ports of the network node are operative to receive incoming packets and emit outgoing packets based on a routing process executing on the processors. A packet tracker and pattern recognition module of the network node is configured to categorize a packet flow having a source IP address and a destination IP address based on observing a specific packet traffic pattern identified for the packet flow. In still further aspects, one or more embodiments of a non-transitory computer-readable medium containing computer-executable program instructions or code portions stored thereon are disclosed for performing one or more embodiments of the methods set forth herein when executed by a processor entity of a network node, gateway element, and the like. Further features of the various embodiments are as claimed in the dependent claims.

Advantages of the present invention include, but not limited to, the ability to recognize and categorize a network's ABR packet flows in a robust manner such that even low cost network infrastructures can support differentiated treatment to ABR packet flows. Because expensive and computationally-intensive techniques such as DPI may be avoided, embodiments of the present invention are capable of identifying ABR packet flows even where the content is encrypted (e.g., DRM protection). Additional benefits and advantages of the embodiments will be apparent in view of the following description and accompanying Figures.

BRIEF DESCRIPTION OF THE DRAWINGS

Embodiments of the present disclosure are illustrated by way of example, and not by way of limitation, in the Figures of the accompanying drawings in which like references indicate similar elements. It should be noted that different references to "an" or "one" embodiment in this disclosure are not necessarily to the same embodiment, and such references may mean at least one. Further, when a particular feature, structure, or characteristic is described in connection with an embodiment, it is submitted that it is within the knowledge of one skilled in the art to effect such feature, structure, or characteristic in connection with other embodiments whether or not explicitly described.

The accompanying drawings are incorporated into and form a part of the specification to illustrate one or more exemplary embodiments of the present disclosure. Various advantages and features of the disclosure will be understood from the following Detailed Description taken in connection with the appended claims and with reference to the attached drawing Figures in which:

DETAILED DESCRIPTION OF THE DRAWINGS

Figure 1A:
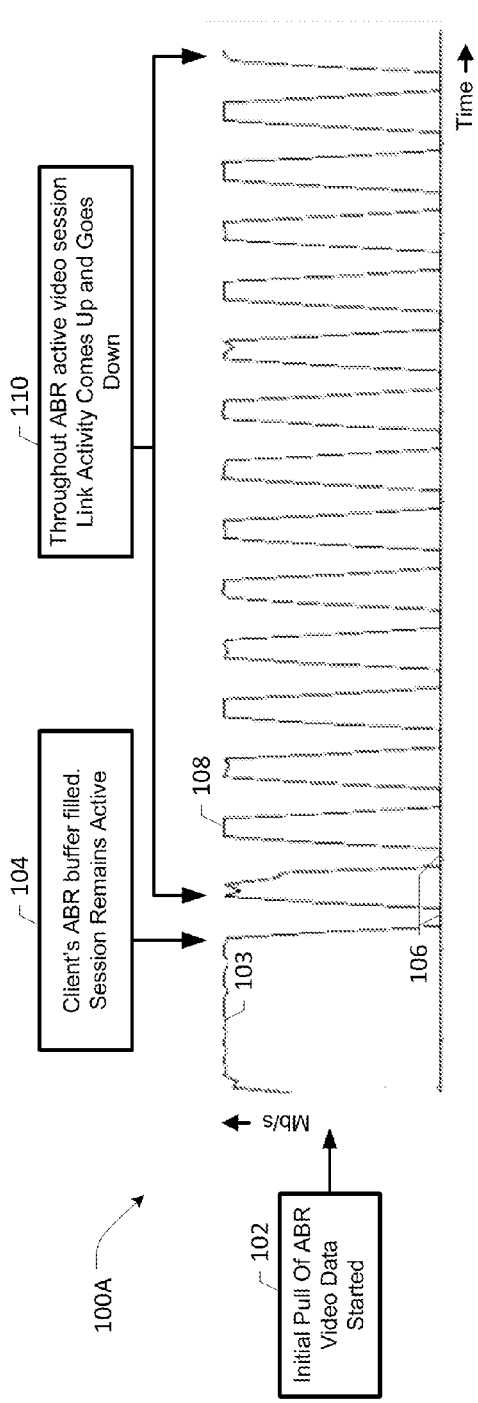
FIG. 1A depicts an embodiment of duty cycle behavior with respect to a communication flow associated with an example ABR client device.

In the following description, numerous specific details are set forth with respect to one or more embodiments of the present patent disclosure. However, it should be understood that one or more embodiments may be practiced without such specific details. In other instances, well-known circuits, subsystems, components, structures and techniques have not been shown in detail in order not to obscure the understanding of the example embodiments. Accordingly, it will be appreciated by one skilled in the art that the embodiments of the present disclosure may be practiced without such specific components. It should be further recognized that those of ordinary skill in the art, with the aid of the Detailed Description set forth herein and taking reference to the accompanying drawings, will be able to make and use one or more embodiments without undue experimentation.

Additionally, terms such as "coupled" and "connected," along with their derivatives, may be used in the following description, claims, or both. It should be understood that these terms are not necessarily intended as synonyms for each other. "Coupled" may be used to indicate that two or more elements, which may or may not be in direct physical or electrical contact with each other, co-operate or interact with each other. "Connected" may be used to indicate the establishment of communication, i.e., a communicative relationship, between two or more elements that are coupled with each other. Further, in one or more example embodiments set forth herein, generally speaking, an element, component or module may be configured to perform a function if the element is capable of performing or otherwise structurally arranged to perform that function.

As used herein, a network element (e.g., a router, switch, bridge, etc.) is a piece of networking equipment, including hardware and software that communicatively interconnects other equipment on a network (e.g., other network elements, end stations, etc.). Some network elements may comprise "multiple services network elements" that provide support for multiple networking functions (e.g., routing, bridging, switching, Layer-2 aggregation, session border control, Quality of Service, and/or subscriber session management, session awareness, and the like), and/or provide support for multiple application services (e.g., data, voice, and video). As such, network elements can be any number or type of entities or nodes that forward packets in a packet-switched network. Some network elements may be disposed in a wireless radio network environment whereas other network elements may be disposed in a public packet-switched network infrastructure, including or otherwise involving suitable content delivery network (CDN) infrastructure. Additional example of network elements may include data forwarding nodes disposed in terrestrial and/or satellite broadband delivery infrastructures, e.g., a Digital Subscriber Line (DSL) architecture, a Data Over Cable Service Interface Specification (DOCSIS)-compliant Cable Modem Termination System (CMTS) architecture, etc., as well as CDN edge and/or regional distribution nodes, etc.

Example subscriber end stations or client devices (i.e., user equipment (UE)) may comprise streaming client devices configured to receive audio/video data (e.g., content) using ABR technologies, as well as non-ABR client devices (progressive download client devices, for instance), all of which may be broadly referred to as "clients" for short. Illustrative ABR client devices may include any device configured to execute, inter alia, a client application for receiving and rendering content delivered from one or more content providers via a suitable IP network according to various streaming technologies, e.g., Microsoft® Silverlight® Smooth Streaming, HTTP streaming (for instance, Dynamic Adaptive Streaming over HTTP or DASH, HTTP Live Streaming or HLS, HTTP Dynamic Streaming or HDS, etc.), Icecast, and so on. Such client devices may therefore include set-top boxes (STBs), TVs, personal/digital video recorders (PVR/DVRs), networked media projectors, portable laptops, netbooks, palm tops, tablets, smartphones, Voice Over Internet Protocol (VOIP) phones, mobile/wireless user equipment, portable media players, portable gaming systems or consoles (such as the WHO, Play Station 3®, etc.) and the like that may access or consume content/services provided as end-to-end communication flows via suitable high speed broadband connections for purposes of one or more embodiments set forth herein.

One or more embodiments of the present patent disclosure may be implemented using different combinations of software, firmware, and/or hardware. Thus, one or more of the techniques shown in the Figures (e.g., flowcharts) may be implemented using code and data stored and executed on one or more electronic devices (e.g., an end station, a network element, etc.). Such electronic devices may store and communicate (internally and/or with other electronic devices over a network) code and data using computer-readable media, such as non-transitory computer-readable storage media (e.g., magnetic disks, optical disks, random access memory, read-only memory, flash memory devices, phase-change memory, etc.), transitory computer-readable transmission media (e.g., electrical, optical, acoustical or other form of propagated signals—such as carrier waves, infrared signals, digital signals), etc. In addition, such electronic devices may typically include a set of one or more processors coupled to one or more other components, such as one or more storage devices (non-transitory machine-readable storage media), user input/output devices (e.g., a keyboard, a touch screen, a pointing device, and/or a display), and network connections. The coupling of the set of processors and other components may be typically through one or more buses and bridges (also termed as bus controllers), arranged in any known (e.g., symmetric/shared multiprocessing) or heretofore unknown architectures. Thus, the storage device or component of a given electronic device may be configured to store code and/or data for execution on one or more processors of that electronic device for purposes of implementing one or more techniques of the present disclosure.

To contextualize the embodiments of the present patent application, an illustrative ABR streaming environment and associated client behavior will be set forth immediately below. Broadly, an ABR server system may be configured to accept media content from live sources as well as static file sources, which source media content may comprise movies, videos, sporting/entertainment/gaming events, concerts, live TV shows, live news broadcasting, etc., for streaming to a plurality of subscribers using a variety of client applications. Initially, source media content is transcoded or otherwise encoded with different bit rates (e.g., multi-rate transcoding) using applicable ABR encoder(s). For example, content of a particular program may be transcoded into five video files using variable bit rates (or, synonymously "bitrates" or "resolutions"), ranging from low to high bit rates (500 Kbs to 10 Mbs, by way of illustration). The particular content is therefore encoded as five different "versions" or "formats", wherein each bitrate is called a profile or representation. A segmentation server or segmenter is operative to divide each version of the encoded media content into fixed duration segments or chunks, which are typically between two and ten seconds in duration, thereby generating a plurality of chunk streams. One skilled in the art will recognize that shorter segments may reduce coding efficiency whereas larger segments may impact the adaptability to changes in network throughput and/or fast changing client behavior. Regardless of the chunk size, the segments may be Group-of-Pictures (GOP)-aligned such that all encoding profiles have the same segments. One or more suitable metadata files referred to as Manifest Files (or, simply, "manifests") are created by the encoder describing the encoding rates, listings of available segments and their associated parameters as well as Uniform Resource Locator (URL) pointers the various segments of encoded content. In one implementation, the Manifest File (MF), a Delivery Format (DF) and means for conversion from/to existing File Formats (FF) and Transport Streams (TS) may be provided by an origin server (i.e., HTTP Adaptive Streaming Server) as part of adaptive streams to the client device over a suitable delivery network.

When the ABR server system receives an HTTP request for media content from a client device, the HTTP Adaptive Streaming Server is operative to send an HTTP response including the manifest and encoded segments as a packetized flow via an end-to-end IP path through the network. It should be appreciated that various data forwarding elements of the network (e.g., originating routers/nodes, intermediary routers/nodes and destination routers/nodes of the core and access network portions) treat the ABR media packets like any other IP packets (i.e., exhibit packet agnostic behavior) and forward packets simply based on forwarding tables. Accordingly, unless resource-consuming techniques such as Deep Packet Inspection are employed, the network elements are generally unable to distinguish the ABR video flows from other IP traffic flows (e.g., flows relative to regular web page viewing or Internet surfing, progressive downloads, etc.).

On the subscriber side, the ABR client/player application executing on the UE device is operative to continually estimate the available bandwidth on the network link or connection based on its internal buffer dynamics, e.g., buffer fill and playout drain, and determine which bitrates of segments to pull. In general, the client selects segment(s) having the appropriate bitrates and fills them into the playout buffer behind any previously received segments, whereupon the player is operative to process the segments into a video stream for viewing/rendering on a suitable display device.

Analysis of ABR client behavior in a scenario such as the one described above shows that clients can exhibit varied behavior, at least in part due do a lack of standardization, with respect to how they request the server for segments. For instance, some clients use a new HTTP request for every segment, while others use TCP's receive window length feedback to the server as a control mechanism. Further, clients for the same content service such as, e.g., Netflix® or YouTube® behave very differently on different platforms, i.e., the Netflix® client on Android behaving differently from that on Apple® iOS. Regardless of such variations, it should be appreciated that typical ABR clients are configured to download ABR content in bursts, filling their buffer and then resting until more content is needed, which results in a cyclical pattern of activity. Additionally, as the ABR clients may be configured to choose their own bitrate for downloading content based on network conditions and because of hardware/software platform variations, such cyclical patterns may vary from client to client, i.e., having different duty cycles. For purposes of the present disclosure, a duty cycle may be defined as a sequence of the intervals of an ABR client downloading until it fills its buffer, and then resting until the buffer is drained by a predetermined amount, e.g., due to completing the playout of a video segment. Referring to FIG. 1A, depicted therein is a screenshot embodiment 100A of duty cycle behavior with respect to a communication flow associated with an example ABR client device, wherein the rate of data being pulled is on Y-axis plotted against time on X-axis. Generally, the ABR client begins to fill its buffer as hard as it can during initial startup phase 102 until it reaches a maximum capacity allowed under the network conditions (e.g., capped to a certain megabits/second of the managed delivery pipe such as 2 Mbs, 4 Mbs, 6 Mbs, etc.), as exemplified by trace portion 103. As the content segments are being downloaded into the client's buffer, their size and number may be monitored or otherwise tracked. The client may begin rendering/playout as soon as it can, and after a certain period of time, the ongoing action of downloading results in reaching a maximum buffer capacity. Accordingly, until the buffer is full, the session remains active (block 104), and the client's duty cycle may commence thereafter. While a segment is being played out of its buffer, the client may enter into a temporary inactive, or sleep, phase 106. When the playback of the segment is completed, the client (re)enters an active, or awake, phase 108, for pulling or downloading another block of content (e.g., the next segment) from the network so as to keep the buffer full (i.e., completely fill its capacity) This sequence or pattern of alternating active and sleep phases continues for the entire video session until a control action (e.g., pause, trick mode navigation, stop, etc.) takes place. It should be appreciated that throughout the ABR active video session, link activity (e.g., wired or wireless) comes up and goes down accordingly (i.e., oscillates) as set forth in block 110.

Figure 1B:
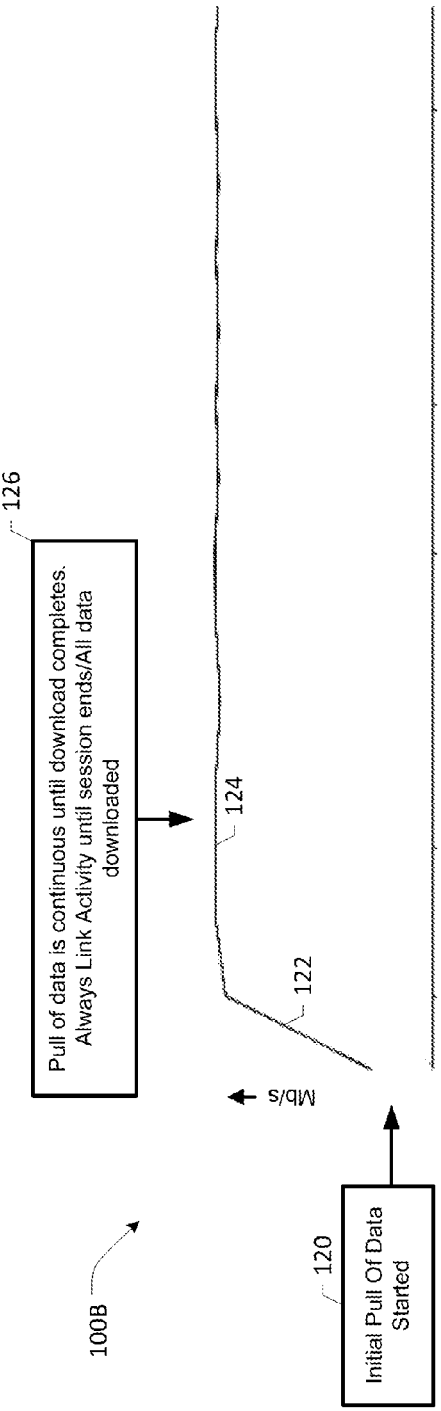
FIG. 1B depicts an embodiment of typical download behavior with respect to a communication flow associated with a non-ABR client device.

In contrast to the duty cycle-based behavior of ABR clients, a non-ABR client exhibits a constant activity behavior as illustrated in FIG. 1B wherein reference numeral 100B refers to a screenshot embodiment of a download process of the non-ABR client (e.g., a progressive download client running a web application). After starting the initial data pull 120, a ramping up phase 122 follows during initial stages, whereupon the client reaches a plateau 124 allowed under existing network conditions. The plateau phase 124 may be maintained relatively constantly (within certain ranges) for the duration of the session. During this phase, data pulling is performed continuously until the download is complete, with constant link activity for the entire session until the end or the data download is completed (block 126).

Based on the foregoing discussion, it can be appreciated that traffic flows relative to ABR sessions in a network exhibit distinct waveform-like patterns that are quite unlike that of regular web page traffic, which exhibits a great deal of randomness in both the data rate and length of inactivity between downloads. Embodiments set forth hereinbelow exploit this phenomenon to identify, recognize and appropriately categorize an IP traffic flow as an ABR flow in order that it may help facilitate additional value-added features and treatments relative to the ABR flow.

Figure 2:
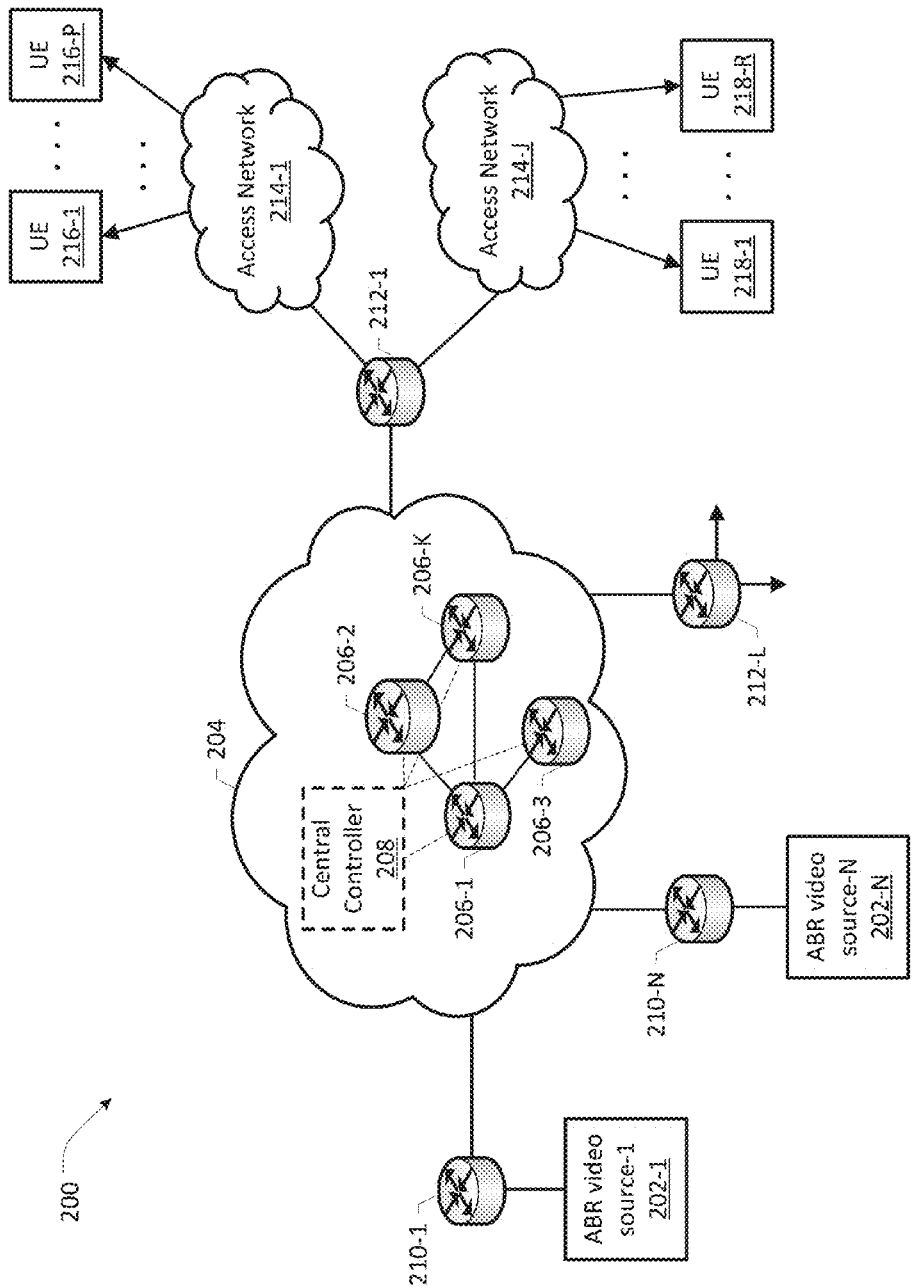
FIG. 2 depicts an example end-to-end network environment wherein communication flows (e.g., IP packet flows) including ABR flows may be identified and categorized according to one or more embodiments of the present patent application.

FIG. 2 depicts an example end-to-end network environment 200 wherein communication flows (e.g., IP packet flows) including ABR flows may be identified and categorized according to one or more embodiments of the present patent application. One skilled in the art shall recognize that the illustrative network environment 200 may comprise various portions of access networks, core networks, distribution networks, etc., involving terrestrial and/or satellite communications technologies, wireline and/or wireless communications technologies, or a combination of thereof, and may involve private packet switched networks, public wide area packet switched networks (e.g., the Internet) that may be architected for providing Cloud-based or Web-based content delivery services, and the like. For instance, in some embodiments, the example network environment 200 may include a content delivery network or CDN formed as an overlay network architected for high-performance streaming of a variety of digital assets or program assets as well as services (which may be broadly referred to as "content" herein) to subscribers using one or more Internet-based infrastructures, private/dedicated infrastructures or a hybrid combination thereof. As alluded to previously, the terms "content" or "content file" as used herein may include digital assets and program assets such as any type of audio/video content or program segment, streaming or static (e.g., recorded over-the-air free network television (TV) shows or programs, pay TV broadcast programs via cable networks or satellite networks, free-to-air satellite TV shows, IPTV programs, etc.), Over-The-Top (OTT) and video-on-demand (VOD) or movie-on-demand (MOD) shows or programs, time-shifted TV (TSTV) content, as well as other content assets provided by content publishers, owners or providers, including but not limited to software files, executable computer code or programs, online electronic games, Internet radio shows/programs, entertainment programs, educational programs, movies, music video programs, and the like, that may be delivered using ABR streaming sessions and/or non-ABR progressive download sessions. In general, the overlay CDN architecture may include a multi-level, hierarchically-organized interconnected assembly of network servers for providing media pathways or "pipes" from one or more central distribution nodes to one or more levels of regional distribution nodes that are connected to one or more local edge servers configured to serve a plurality of end users or subscribers in respective serving location areas. In addition to such "distribution servers" (sometimes also referred to as "surrogates"), a CDN portion of the example network environment 200 may also include and/or interoperate with various network elements configured to effectuate request redirection or rerouting mechanisms as well as related back office systems or nodes such as operator/subscriber policy management systems, bandwidth scheduling systems, account/billing systems, and the like, that may be deployed as part of the associated back office infrastructure (not specifically shown in FIG. 1).

Various network elements configured for routing IP traffic, e.g., routers, switches, or more broadly, data forwarding elements, may be disposed at different levels within the example network environment 200, e.g., near or proximate to various endpoints as well as within access and core network portions (generally referred to as intermediary network elements), running on suitable TCP/IP-based routing protocols according to known standards and specifications. Illustratively, some portions of the network environment may involve a router network based on link-state protocols such as the Intermediate System-to-Intermediate System (IS-IS) routing protocol, Open Shortest Path First (OSPF) routing protocol, etc., and/or distance-vector routing protocols, which can be grouped as Interior Gateway Protocols (IGP) that may be used for routing information within a domain or autonomous system (AS) or as Exterior Gateway Protocols (EGP) that may be used for determining network reachability across multiple domains that may span an end-to-end path.

By way of illustration, a number of ABR video/content sources 202-1 to 202-N are exemplified in FIG. 2, which may be hosted in corresponding multi-tenancy datacenter environments, for instance. Although only ABR video/content sources 202-1 to 202-N are shown for generating IP traffic routed through the network environment 200, it should be recognized that the network environment 200 also includes a vast array of different kinds of sources generating other IP traffic (i.e., non-ABR traffic) that may be routed in myriad end-to-end paths. Routers 210-1 to 210-N are exemplary of ABR source-associated data forwarding elements that may be configured to inject ABR IP traffic into a packet-switched IP network portion 204 comprising a plurality of intermediary routers, e.g., inbound/ingress and outbound/egress border routers, intra-network routers, collectively referred to by reference numerals 206-1 to 206-K. Routing elements disposed between the network portion 204 and various subscriber access networks 214-1 to 214-J are shown as elements 212-1 to 212-L, where a router may couple to one or more access networks. As pointed out previously, access networks 214-1 to 214-J may comprise any number and/type of networks (including but not limited to radio access networks or RANs) configured to provide broadband access to various subscriber stations, e.g., UE 216-1 to 216-P via access network 214-1 and UE 218-1 to UE 218-R. In one example embodiment, at least a portion of the UE devices being served by an access network may be disposed in or otherwise associated with a subscriber or subscriber premises that is coupled to the access network via a suitable gateway (GW) (not specifically shown in FIG. 1).

In an additional or alternative arrangement, at least a portion of the network environment 200 may be architected as a Software-Defined Network (SDN) based on known protocols such as, e.g., Extensible Messaging and Presence Protocol (XMPP), OpenFlow (OF) protocol, Forwarding and Control Element Separation (ForCES) protocol, etc. As an illustration, network portion 204 may include an SDN architecture wherein the routing elements may comprise simple data forwarding elements configured to forward packets responsive to a centralized controller entity 208. An example SDN architecture may therefore involve separation and decoupling of the control and data planes of the network routing elements, whereby network intelligence and state control may be logically centralized and the underlying network infrastructure is abstracted from the applications. Accordingly, one implementation of an SDN-based service network may comprise a network-wide control platform, executing on or more servers in the network, which is configured to oversee and control a plurality of data forwarding nodes or switches. As a consequence, a standardized interfacing may be provided between the network-wide control platform (illustrated as central controller 208 for purposes of some embodiments of the present patent application) and the data switching/forwarding nodes, thereby facilitating high scalability, flow-based packet tracking, multi-tenancy and secure infrastructure sharing, virtual overlay networking, efficient load balancing, and the like. In contrast, it should be appreciated that in a traditional network architecture embodiment, routing elements of network portion 204 follow an integrated design where the control plane and data-forwarding plane are tightly coupled in the same network element.

As a typical SDN switching node, a router (e.g., element 206-1) may include a flow table, which performs packet lookup and forwarding, and a secure channel that connects the switch to the central controller, allowing commands and packets to be sent therebetween using a protocol. The main task of a forwarding element, or a switch, is to forward packets from an ingress port to an egress port, according to the rules in the flow table programmed by the controller. The flow table may contain a set of flow entries, activity counters, and a set of one or more actions to apply to matching packets. For instance, a flow entry may be configured with a set of actions such as: forwarding packets to a given port, modifying certain bits in the packet header, encapsulating packets to the controller, or simply dropping the packets. The switch can also be used to forward all slow-path packets, e.g., Internet Control Message Protocol (ICMP) packets, to the controller for processing. It should be appreciated that the concept of a data packet flow can be defined broadly, e.g., a Transmission Control Protocol (TCP) connection, or all traffic from a particular Media Access Control (MAC) address or Internet Protocol (IP) address, or all packets with the same Virtual LAN (VLAN) tag, or all packets from the same switch port, or all traffic having one or more user-defined control flags, as well as including any combination of the foregoing conditionalities.

Regardless of whether SDN architecture is involved, a flow within the network environment 200 may be treated as a uni-directional traffic stream of IP packets with a set of unique attributes that may be described in an n-tuple descriptor. These attributes may comprise, e.g., source-IP-address, source-port, destination-IP-address, destination-port, IP-protocol, Type of Service (TOS) or Class of Service (COS), and input switch interface ID. When a router receives a packet for which it currently does not have a flow entry, a flow structure is initialized to maintain state information regarding that flow, i.e., number of bytes exchanged, IP addresses, port numbers, AS numbers, etc. Each subsequent packet matching the same parameters of the flow will contribute to the byte count and packet count of the flow structure until the flow is terminated and exported. Thus, all packets with the same source/destination IP address, source/destination ports, protocol interface and class of service are grouped into a flow, whereupon packets and bytes can be monitored for network traffic management purposes.

It should be appreciated that various pieces of the following flow information (and their respective functions) may be utilized for purposes of at least some embodiments of the present applications: source address allows the understanding of who is originating the traffic; destination address indicates who is receiving the traffic; ports characterize the application utilizing the traffic; class of service examines the priority of the traffic; device interfaces inform how the network device is being utilized by the traffic; tallied packets and bytes to indicate the amount or volume of traffic. Additional pieces of flow information may include: flow timestamps to understand the life of a flow (e.g., timestamps are useful for calculating packets and bytes per second); next hop IP addresses including BGP routing Autonomous Systems (AS); subnet mask for the source and destination addresses to calculate prefixes; and TCP flags to examine TCP handshakes. As will be seen below, at least a portion of the flow information may be used for monitoring packets and effectuating flow type categorization according to one or more embodiments set forth in additional detail below.

Figure 3:
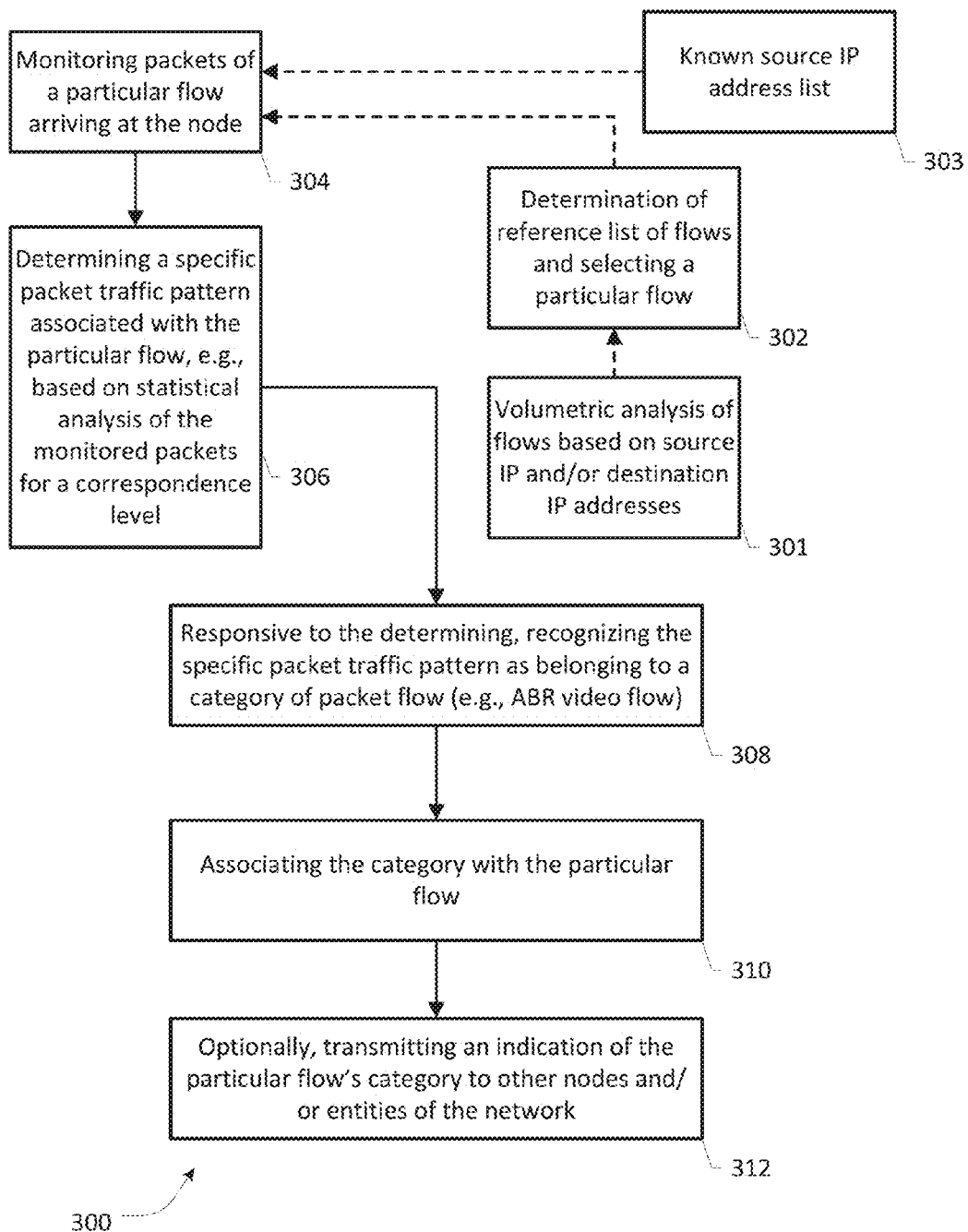
FIG. 3 is a flowchart depicting various steps, acts or blocks relative to an embodiment for tracking, identifying and categorizing ABR flows in an example communication network.

FIG. 3 is a flowchart depicting various steps, acts or blocks relative to a process 300 for tracking, identifying and categorizing ABR flows in an example communication network such as the network environment 200 set forth above. Broadly, one or more variations of process 300 involve a detection mechanism that is based on the insight that an ABR traffic pattern looks like a pulse train characterized by a duty cycle (which, as described above, can be defined as the time from the end of any one pulse other than the first one corresponding to the client buffer's initial filling to the end of the next pulse). In one arrangement, process 300 may involve monitoring packets of a particular flow arriving at a network node (block 304) and determining that there is a specific packet traffic pattern associated with the particular flow based on a degree of correspondence between the monitored packets of the particular flow and a reference flow (block 306). In example implementations, a reference flow may comprise a known flow associated with any number of popular ABR video formats, with each format relying on a specific video encoder (e.g., H.264, MPEG-DASH, High Efficiency Video Coding or HEVC (H.265), and the like). Also, the length of a reference flow for comparison against the monitored packets (e.g., based on statistical analysis) may be predetermined, such as 30 seconds, 60 seconds, for instance. In another arrangement, prior to monitoring a particular flow at a node, a filtering process may be employed to narrow down the total number of flows associated the node (which can run into millions in some network installations) to a small subset of flows for monitoring from which the particular flow may be selected. Such filtering processes may involve a variety of techniques based on network traffic engineering principles to determine the subset. For example, a volumetric/quantitative analysis may yield identities of flows having a volume greater than a select threshold, for instance, a number of packets or bytes over a period of time. Another level of volumetric analysis may involve analyzing flows based on source IP and/or destination IP addresses. The foregoing acts are set forth at blocks 301 and 302. In a still further level, filtering an/or selecting an IP flow may be based on known source IP addresses associated with popular content providers such as Netflix®, YouTube®, or Amazon® Prime, etc. (block 303).

Returning to block 306, determination that a specific packet traffic pattern is associated with the monitored flow may be based on performing suitable statistical analysis on the monitored flow packets (over a select period of time) to determine that there is a degree of correspondence or pattern matching (e.g., statistically significant) between the monitored flow packets and the reference flow. In one implementation, the specific packet traffic pattern may comprise a substantially periodic pattern of a group of values (e.g., binary values such as 1's or 0's depending on the digital logic used) indicative of arrival of packets of the particular flow followed by a group of values (e.g., binary values such as 1's or 0's, depending on the digital logic used) indicative of absence of the packets of the particular flow over a period of time. Analytical techniques such as pattern recognition, concordance analysis, correlation analysis, similarity analysis, and the like may also be provided as additional and/or alternative variations as part of the decision logic for determining pattern matching. Responsive to the determinations of block 306, the specific packet traffic pattern of the particular flow may be recognized as belonging to a category of packet flow (e.g., ABR video flow) as set forth at block 308. Thereafter, a suitable indication or identifier that the particular flow is an ABR video flow category may be associated with the flow's packets (e.g., as another attribute in an n-tuple bit field) and such an indicator/identifier may be transmitted to other nodes or entities of the network, e.g., for management purposes, as set forth at blocks 310 and 312. One skilled in the art will recognize that at least a portion of the acts set forth herein, e.g., including but not limited to blocks 301-303, 310 and 312, may be optionally implemented in certain embodiments.

Figure 4:
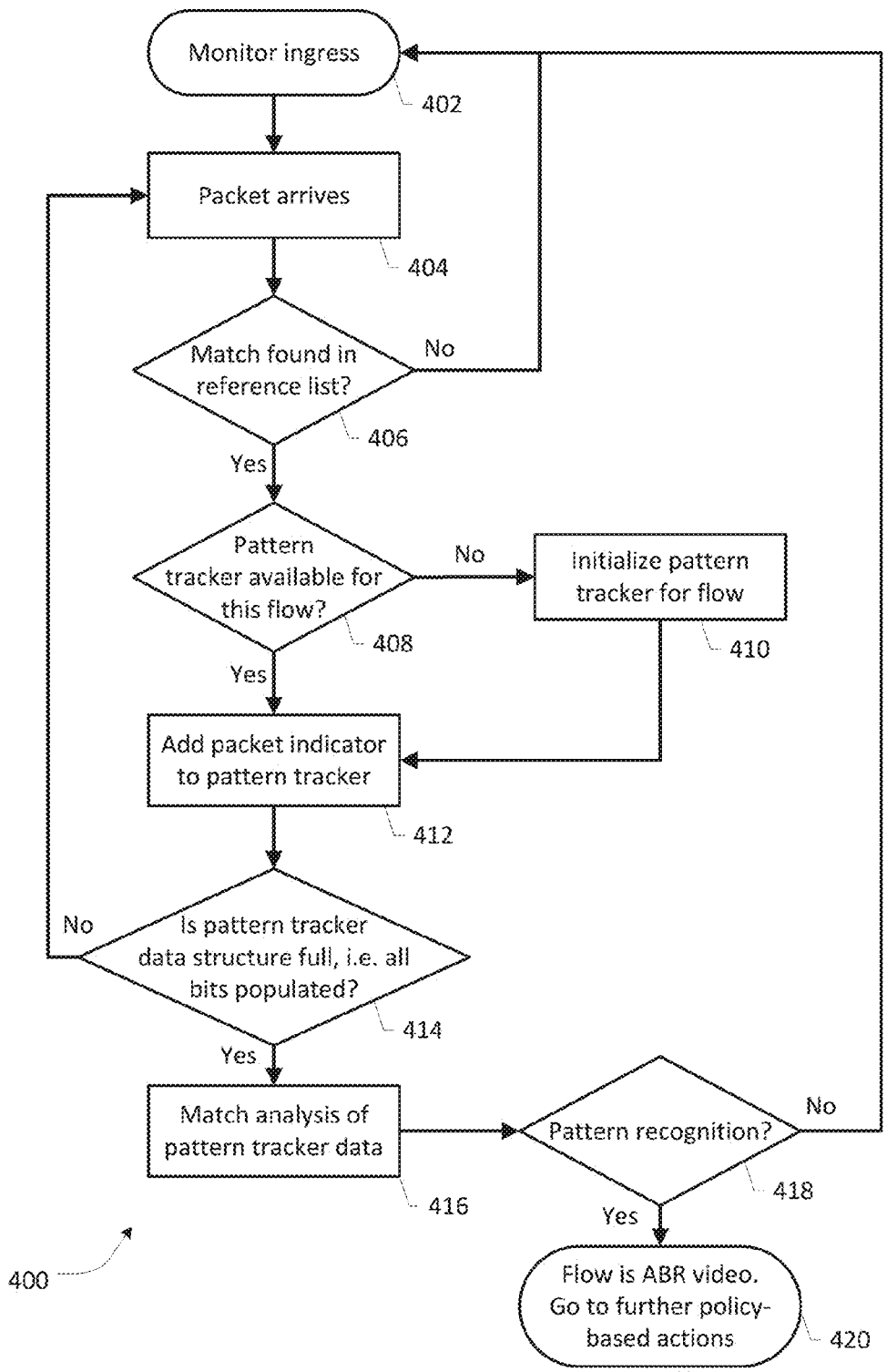
FIG. 4 is a flowchart depicting additional details with respect to tracking, identifying and categorizing ABR flows in a further embodiment.

Turning to FIG. 4, depicted therein is a flowchart of a process 400 with additional details relative to tracking, identifying and categorizing ABR flows in a further embodiment, which in one implementation may be an additional or alternative arrangement of the scheme above. As the packets of various flows arrive at one or more ingress ports of a network element (e.g., a proxy or router associated with the video source's data center, a CDN edge node, an access network gateway element, a premises gateway element, etc.), appropriate logic or program instructions may be configured, either local to the network element itself or externally at a central controller, to monitor such packet ingress (blocks 402 and 404). If a particular flow is found in a reference list, which may be continually updated, a determination is made whether a packet tracker module including a tracker data structure is available for the flow (blocks 406 and 408). As will be recognized by one skilled in the art, the tracker data structure is a key component for the embodiments set forth herein, which one implementation may be constructed based on information from Layer 3 only (IP) or Layers 3-7 (IP, TCP, and higher). In general, the header information that is needed for inspection may include the IP layer header parts/fields, i.e., source IP address, destination IP address, IP QoS fields, etc., and those from higher layers, i.e. TCP source port, TCP destination port, HTTP layer information, etc., as pointed out previously. Because the network element may be provided with various techniques for classification that can examine headers of packets received on any ingress port, depending on the available computing power and the use of encryption such as IPsec, TLS, etc., the packet tracker construction process may advantageously leverage such inspection methodologies for dynamically building and storing a suitable tracker data structure. When a specific classificatory match is found for a packet header, an embodiment of process 400 is operative to initiate the pattern tracker that may contain among other quantities, key indicators such as a packet counter, a binary indicator, and time stamps. For instance, a packet counter can be incremented whenever a packet is received, or a binary indicator can be set for every such packet, creating a pattern of 1's and 0's over time. The pattern tracker data structure may therefore be populated with the indicators until a desired length is reached. The foregoing operations may be exemplified by blocks 408, 410 and 412 of process 400. It should be appreciated that that the pattern tracker data structure should preferably be of the same length as a reference list flow pattern in order to facilitate proper mathematical and statistical operations for purposes of pattern recognition and flow identification based on statistical inference as exemplified at blocks 416 and 418

One skilled in the art will appreciate that a classificatory mechanism may only utilize the headers fields that are visible to it due to the potential use of encryption. For example, if IPsec is used, only the IP layer headers are visible to the classifier, and thus it will only be able to use the source and destination IP ports and any IP QoS fields. If TLS is used but not IPsec, both IP and TCP headers are visible. In this case, the classifier can additionally use TCP port numbers. In some other situations, only the content may be encrypted, leaving all headers in the clear, and in some situations no encryption may be used. In such cases, an embodiment of the present invention can use even HTTP layer information. Additionally, as mentioned earlier, some clients may go to the extent of using a different HTTP session for each segment of video. In such an implementation, if the classifier is able to use TCP/HTTP layer information, it would need to track and correlate the different sessions to infer that it is indeed a single video content flow. Tracking and correlation of different segments may therefore be provided as implementation dependent. For instance, the client may use progressively increasing port numbers, in which case there is a pattern that the classifier scheme can recognize and correlate the media segments accordingly.

As pointed out previously, the contents of a populated tracker data structure may be statistically analyzed (e.g., detecting whether there is a degree for correspondence between the tracker contents and a specific reference pattern). In one implementation of statistical comparison, suitable bit masks may be provided that can be combined with an AND operation, followed by a summation to determine whether a majority of the bits in the mask matched with the reference pattern. If a desired majority, e.g., 50% of the bits in the mask, is met then the flow may be deemed to be an ABR video flow. If there is no significant correspondence, control of process 400 may go back to monitoring packet ingress, further to the operations set forth at blocks 416 and 418. As such, hypotheses testing may be performed with various levels of statistical significance (e.g., 90% confidence level, 95% confidence level, etc.). As an indirection comparison, various implementations may be realized in a particular hypothesis testing scenario such that false negatives are reduced (i.e., minimization of rejection rate). On the other hand, if a stricter direct comparison based on a suitable metric (e.g., distance between two points in an N-dimensional space) is implemented, higher rates of rejection may be encountered. Regardless of how implemented, if a specific pattern is recognized (e.g., ABR flow), further actions may take place, including but not limited to service differentiation, bandwidth control, price/quality level management, etc., based on policy management rules as well as subscriber profiles and/or content provider policies (block 420).

Those skilled in the art should recognize that an embodiment of foregoing processes may be implemented at a subscriber edge location such as a broadband network gateway since the IP addresses of both the video source and video client destination are readily available. Further, such locations are also typically the most in need of flow management, e.g., due to the high consumption of video on the egress links towards subscribers. However, it is also possible—and may be beneficial—to implement an embodiment of the present invention at other routers or proxies as feasible and/or desirable by the network operator. Alternatively or additionally, it is also possible to implement an embodiment of the present invention at different levels of sophistication at different locations, and further to communicate between these locations to enhance the overall system.

Figure 5:
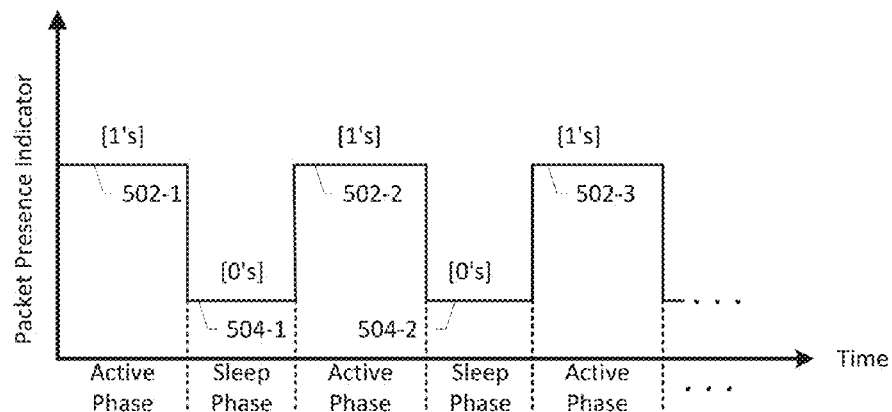
FIG. 5 is an example packet traffic pattern associated with a communication flow for recognizing it as an ABR flow.

FIG. 5 is an example packet traffic pattern 500 associated with a communication flow for recognizing it as an ABR flow. Corresponding to the duty cycle of the communication flow, alternating groups of 1's and 0's may be tracked and stored in a pattern tracker database. Reference numerals 502-1 to 502-3 refer to three groups of 1's indicative of arrival or presence of packets of the communication flow during the duty cycle's active phases. In similar fashion, reference numerals 504-1 and 504-2 refer to two groups of 0's indicative of absence of packets of the communication flow corresponding to the sleep phases of the duty cycle.

Figure 6:
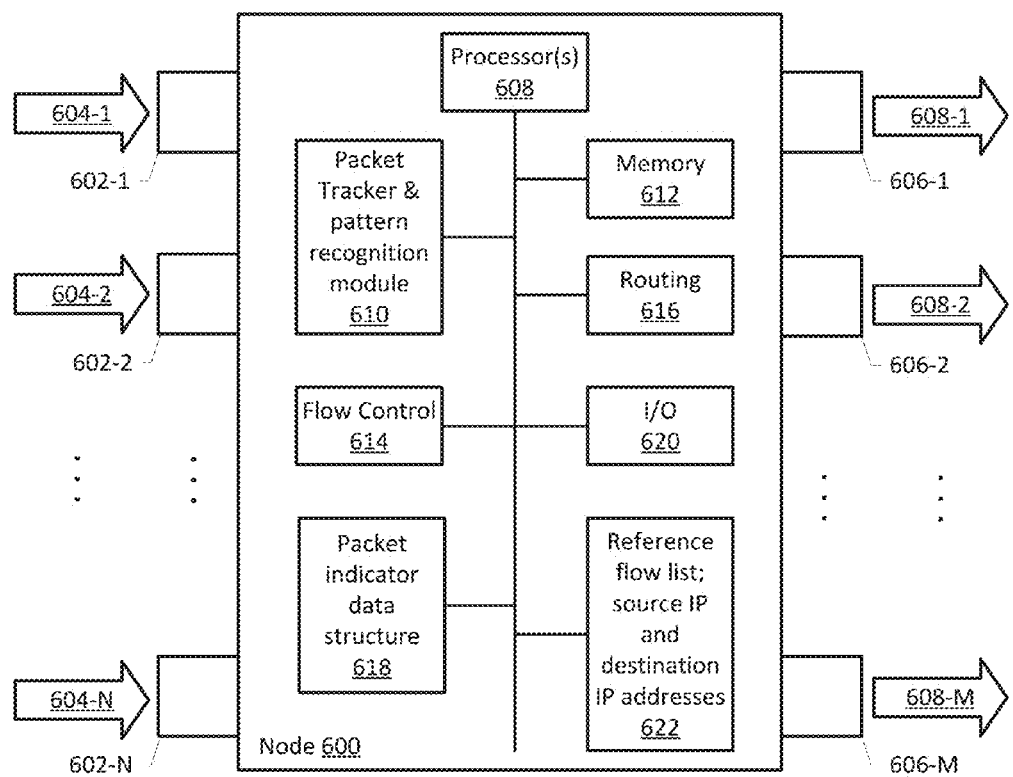
FIG. 6 is a block diagram of a network node or element or an apparatus associated therewith that may be configured to facilitate tracking, identifying and categorizing ABR flows according to one or more embodiments of the present patent application.

FIG. 6 is a block diagram of an apparatus 600 associated with or otherwise comprising a network node or element (e.g., nodes 210-1 to 210-N, 206-1 to 206-K or 212-1 to 212-L, etc. shown in FIG. 2) that may be configured as to facilitate tracking, identifying and categorizing ABR flows according to one or more embodiments of the present patent application. One or more processors 608 in conjunction with suitable memory 612 (e.g., volatile and/or nonvolatile memory) may be provided for the overall control of node 600, including flow identification and categorization in conjunction with suitable modules or subsystems. A plurality of ingress ports 602-1 to 602-N are operative to receive corresponding incoming packet flows 604-1 to 602-N, which may be switched/routed based on either local flow control 614 and routing logic 616 or based on a centralized controller (e.g., in an SDN arrangement) for facilitating packet egress via egress ports 606-1 to 606-M as outgoing packet flows 608-1 to 608-M. One or more input/output (I/O) interfaces 620 may be configured for control communication with other network entities such as controller nodes. A packet tracker and pattern recognition module 610 may be implemented in a persistent memory containing suitable program instructions that may be executed by processors 608 for effectuating the operations described above. A packet indicator data structure 618 may be configured for dynamically populating traffic pattern data for various monitored flows. Likewise, a storage structure 622 is operative for storing reference flow lists, known source and/or destination IP addresses, other packet classifiers, reference patterns, and the like.

It should be apparent that the packet tracker and pattern recognition/categorization functionalities may be distributed in certain decoupled network element architectures, and accordingly, some of the foregoing blocks illustrated in FIG. 6 may be implemented at a different node or network element (e.g., as a system). While there is no hard-and-fast rule, at least some components may need to be implemented at data path elements since they see the packets. At one level, if the data path elements are simple forwarding elements under a centralized controller, I/O interface 620 is operative to send appropriate control signals to the controller (e.g., controller 208 in FIG. 2) to track and/or populate a tracker data structure for effectuating pattern recognition and flow categorization. For instance, the structural components and functionalities of block 610 in FIG. 6 may be separated such that the tracker component may be configured to operate at the data path element (e.g., elements 206-1 to 206-K in FIG. 2) whereas the pattern determination and recognition module may be configured to operate at the controller 208. Likewise, several other distributed implementations may be realized within the ambit of the teachings herein. On the other hand, if network node 600 is a more complex data path element, such processes may be locally executed.

One skilled in the art will appreciate upon reference hereto that the packet flow categorization scheme set forth herein provides a fairly robust methodology that may be implemented at different levels of complexity and/or organizational hierarchy in an end-to-end network. For example, embodiments of the invention need not even be very accurate to enable beneficial impact. Even if only 20-30% of video flows are detected as such, given the vast amounts of traffic that these flows carry, it can still result in measurable benefit to network operators. As the detection/recognition processes and implementations are tuned and optimized further, the benefits would only increase. Further, since it does not depend on technologies such as Deep Packet Inspection, embodiments of the present invention can detect ABR video even if the video content and web headers are encrypted. Also, there is almost no negative impact of false positives in implementing an embodiment of the present invention. In the context of the present invention, a false positive is an incorrect decision that a flow is ABR video when it really is not. For, even if regular web traffic or even a short lived video flow is incorrectly detected, its bandwidth consumption is low enough or short lived to cause any significant impact. Accordingly, due to the low impact of false positives, the detection thresholds in a particular embodiment can be set aggressively to ensure high detection rates. This reduces the possibility of false negatives, which occurs when the method decides that a flow is not ABR video even though it really is so. Furthermore, the underlying pattern recognition technique of an embodiment can be made to be as computationally simple and/or feasible as needed. Such flexibility allows for an embodiment to be implemented even on low capability routers if need be. A skilled artisan will recognize that this is a significant advantage since the process can be tuned as mentioned above so that the false negatives are minimized with little or no penalties due to false positives, and can therefore be deployed even in low cost infrastructures.

In the above-description of various embodiments of the present disclosure, it is to be understood that the terminology used herein is for the purpose of describing particular embodiments only and is not intended to be limiting of the invention. Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of this specification and the relevant art and may not be interpreted in an idealized or overly formal sense expressly so defined herein.

At least some example embodiments are described herein with reference to block diagrams and/or flowchart illustrations of computer-implemented methods, apparatus (systems and/or devices) and/or computer program products. It is understood that a block of the block diagrams and/or flowchart illustrations, and combinations of blocks in the block diagrams and/or flowchart illustrations, can be implemented by computer program instructions that are performed by one or more computer circuits. Such computer program instructions may be provided to a processor circuit of a general purpose computer circuit, special purpose computer circuit, and/or other programmable data processing circuit to produce a machine, so that the instructions, which execute via the processor of the computer and/or other programmable data processing apparatus, transform and control transistors, values stored in memory locations, and other hardware components within such circuitry to implement the functions/acts specified in the block diagrams and/or flowchart block or blocks, and thereby create means (functionality) and/or structure for implementing the functions/acts specified in the block diagrams and/or flowchart block(s). Additionally, the computer program instructions may also be stored in a tangible computer-readable medium that can direct a computer or other programmable data processing apparatus to function in a particular manner, such that the instructions stored in the computer-readable medium produce an article of manufacture including instructions which implement the functions/acts specified in the block diagrams and/or flowchart block or blocks.

As alluded to previously, tangible, non-transitory computer-readable medium may include an electronic, magnetic, optical, electromagnetic, or semiconductor data storage system, apparatus, or device. More specific examples of the computer-readable medium may include the following: a portable computer diskette, a random access memory (RAM) circuit, a read-only memory (ROM) circuit, an erasable programmable read-only memory (EPROM or Flash memory) circuit, a portable compact disc read-only memory (CD-ROM), and a portable digital video disc read-only memory (DVD/Blu-ray). The computer program instructions may also be loaded onto or otherwise downloaded to a computer and/or other programmable data processing apparatus to cause a series of operational steps to be performed on the computer and/or other programmable apparatus to produce a computer-implemented process. Accordingly, embodiments of the present invention may be embodied in hardware and/or in software (including firmware, resident software, micro-code, etc.) that runs on a processor or controller, which may collectively be referred to as "circuitry," "a module" or variants thereof. Further, an example processing unit may include, by way of illustration, a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Arrays (FPGAs) circuits, any other type of integrated circuit (IC), and/or a state machine. As can be appreciated, an example processor unit may employ distributed processing in certain embodiments.

Further, in at least some additional or alternative implementations, the functions/acts described in the blocks may occur out of the order shown in the flowcharts. For example, two blocks shown in succession may in fact be executed substantially concurrently or the blocks may sometimes be executed in the reverse order, depending upon the functionality/acts involved. Moreover, the functionality of a given block of the flowcharts and/or block diagrams may be separated into multiple blocks and/or the functionality of two or more blocks of the flowcharts and/or block diagrams may be at least partially integrated. Furthermore, although some of the diagrams include arrows on communication paths to show a primary direction of communication, it is to be understood that communication may occur in the opposite direction relative to the depicted arrows. Finally, other blocks may be added/inserted between the blocks that are illustrated.

It should therefore be clearly understood that the order or sequence of the acts, steps, functions, components or blocks illustrated in any of the flowcharts depicted in the drawing Figures of the present disclosure may be modified, altered, replaced, customized or otherwise rearranged within a particular flowchart, including deletion or omission of a particular act, step, function, component or block. Moreover, the acts, steps, functions, components or blocks illustrated in a particular flowchart may be inter-mixed or otherwise inter-arranged or rearranged with the acts, steps, functions, components or blocks illustrated in another flowchart in order to effectuate additional variations, modifications and configurations with respect to one or more processes for purposes of practicing the teachings of the present patent disclosure.

Although various embodiments have been shown and described in detail, the claims are not limited to any particular embodiment or example. None of the above Detailed Description should be read as implying that any particular component, element, step, act, or function is essential such that it must be included in the scope of the claims. Reference to an element in the singular is not intended to mean "one and only one" unless explicitly so stated, but rather "one or more." All structural and functional equivalents to the elements of the above-described embodiments that are known to those of ordinary skill in the art are expressly incorporated herein by reference and are intended to be encompassed by the present claims. Accordingly, those skilled in the art will recognize that the exemplary embodiments described herein can be practiced with various modifications and alterations within the spirit and scope of the claims appended below.

What is claimed is:

1. A method of categorizing packet flows through a node disposed in a data communications network, the method comprising:

monitoring for arrival of packets of a particular flow arriving at the node over a period of time via a communication link to form an arrival sequence associated with the packets as they arrive at the node, the arrival sequence formed as a binary sequence of 1's and 0's indicating presence and absence respectively of the packets over the communication link for the particular flow during the period of time;

determining that there is a specific packet traffic pattern associated with the particular flow based on comparing the arrival sequence of the monitored packets of the particular flow against a reference sequence of bits associated with a reference flow selected from a plurality of known flows, the comparison performed over a predetermined time window corresponding to the reference flow;

responsive to the determining, classifying the specific packet traffic pattern as belonging to a category of packet flow;

associating an indication of the category with the particular flow; and transmitting the indication of the category of the particular flow to one or more downstream intermediary router nodes disposed in the data communications network, wherein the category of the particular flow is recognized as an adaptive bitrate (ABR) video flow having a duty cycle, and further wherein a group of values indicative of presence of the arrival of packets corresponds to an active phase of the duty cycle and a group of values indicative of absence of the packets corresponds to a sleep phase of the duty cycle.

2. The method as recited in claim 1, wherein the monitoring of packets is performed after determining that the particular flow belongs to a reference list of flows through the node.

3. The method as recited in claim 2, wherein the reference list of flows is determined by identifying flows having a volume greater than a select threshold over a period of time.

4. The method as recited in claim 3, wherein the identification of flows further comprises:
performing a volumetric analysis of flows based on source Internet Protocol (IP) addresses and destination IP addresses of all incoming packets; and
selecting, based on the volumetric analysis, a flow identified by a source IP and destination IP address pair for inclusion in the reference list.

5. The method as recited in claim 1, wherein a degree of correspondence between the binary sequence of 1's and 0's associated with the monitored packets and the reference sequence of bits associated with the reference flow is determined to be a statistically significant correspondence.

6. The method as recited in claim 1, wherein the specific packet traffic pattern comprises a substantially periodic pattern of the group of values indicative of arrival of packets of the particular flow followed by the group of values indicative of absence of the packets of the particular flow over the predetermined time window corresponding to the reference flow.

7. The method as recited in claim 6, wherein the group of values indicative of arrival of packets comprises a series of binary 1's, each binary 1 corresponding to an incoming packet of the particular flow via the communication link.

8. The method as recited in claim 7, wherein the group of values indicative of absence of the packets comprises a series of binary 0's, each binary 0 corresponding to an indication that there is no incoming packet for the particular flow at a given time point in monitoring.

9. The method as recited in claim 1, wherein at least one of the acts of determining that there is a specific packet traffic pattern associated with the particular flow and classifying the specific packet traffic pattern is performed at a Software-Defined Network (SDN) controller operatively associated with a plurality of data path elements arranged in an SDN.

10. An apparatus for categorizing packet flows through a node disposed in a data communications network, the apparatus comprising:
one or more processors; and
a persistent memory coupled to the one or more processors, wherein the persistent memory includes instructions executable by the one or more processors and configured to:
monitor for arrival of packets of a particular flow arriving at the node over a period of time via a communication link to form an arrival sequence associated with the packets as they arrive at the node, the arrival sequence formed as a binary sequence of 1's and 0's indicating presence and absence respectively of the packets over the communication link for the particular flow during the period of time;
determine that there is a specific packet traffic pattern associated with the particular flow based on comparing the arrival sequence of the monitored packets of the particular flow against a reference sequence of bits associated with a reference flow selected from a plurality of known flows, the comparison performed over a predetermined time window corresponding to the reference flow;
responsive to the determining, classify the specific packet traffic pattern as belonging to a category of packet flow; and
associate an indication of the category with the particular flow;
wherein the persistent memory further includes instructions for transmitting the indication of the category of the particular flow to one or more downstream intermediary router nodes disposed in the data communications network, and
wherein the category of the particular flow is recognized as an adaptive bitrate (ABR) video flow having a duty cycle, and further wherein a group of values indicative of presence of the arrival of packets corresponds to an active phase of the duty cycle and a group of values indicative of absence of the packets corresponds to a sleep phase of the duty cycle.

11. The apparatus as recited in claim 10, wherein the persistent memory further includes comprises instructions for determining that the particular flow belongs to a reference list of flows through the node, and further wherein the monitoring of packets is performed after determining that the particular flow belongs to the reference list.

12. The apparatus as recited in claim 11, wherein the reference list of flows is determined by identifying flows having a volume greater than a select threshold over a period of time.

13. The apparatus as recited in claim 12, wherein the persistent memory comprises instructions configured to:
perform a volumetric analysis of flows based on source Internet Protocol (IP) addresses and destination IP addresses of all incoming packets; and
select, based on the volumetric analysis, a flow identified by a source IP and destination IP address pair for inclusion in the reference list.

14. The apparatus as recited in claim 10, wherein the specific packet traffic pattern comprises a substantially periodic pattern of the group of values indicative of arrival of packets of the particular flow followed by the group of values indicative of absence of the packets of the particular flow over the predetermined time window corresponding to the reference flow.

15. The apparatus as recited in claim 14, wherein the group of values indicative of the arrival of packets comprises a series of binary 1's, each binary 1 corresponding to an incoming packet of the particular flow via the communication link.

16. The apparatus as recited in claim 15, wherein the group of values indicative of absence of the packets comprises a series of binary 0's, each binary 0 corresponding to an indication that there is no incoming packet for the particular flow at a given time point in monitoring.

17. A node, comprising:
one or more processors;
one or more ingress ports and one or more egress ports, each ingress port operating to receive incoming packets and each egress port operating to emit outgoing packets based on a routing process executed by the one or more processors; and
a packet tracker and pattern recognition module configured to interoperate with the one or more processors for performing the following acts:
monitor for arrival of packets of a particular flow arriving at the node over a period of time via a communication link to form an arrival sequence associated with the packets as they arrive at the node, the arrival sequence formed as a binary sequence of 1's and 0's indicating presence and absence respectively of the packets over the communication link for the particular flow during the period of time;

determine that there is a specific packet traffic pattern associated with the particular flow based on comparing the arrival sequence of the monitored packets of the particular flow against a reference sequence of bits associated with a reference flow selected from a plurality of known flows, the comparison performed over a predetermined time window corresponding to the reference flow;

responsive to the determining, classify the specific packet traffic pattern as belonging to a category of packet flow; and associate an indication of the category with the particular flow;

wherein the packet tracker and pattern recognition module is further configured to transmit the indication of the category of the particular flow to one or more downstream intermediary router nodes disposed in a data communications network, and wherein the packet tracker and pattern recognition module is further configured to categorize the packet flow as an adaptive bitrate (ABR) video flow having a duty cycle, responsive to observing a repetitive pattern of a group of packet arrival indicators followed by a group of packet absence indicators over the predetermined time window.

18. The node as recited in claim 17, wherein the node is configured as one of a data center router associated with a content source generating the ABR video flow, an intermediary downstream router, an application-aware Hypertext Transfer Protocol (HTTP) proxy node, a Content Delivery Network (CDN) node, and a gateway serving a subscriber premises to which the ABR video flow is directed.

* * * * *